Jan. 22, 1935.  A. BOUWERS ET AL  1,988,993
APPARATUS FOR EXAMINING CRYSTALLINE BODIES BY MEANS OF X-RAYS
Filed April 28, 1930   2 Sheets-Sheet 1
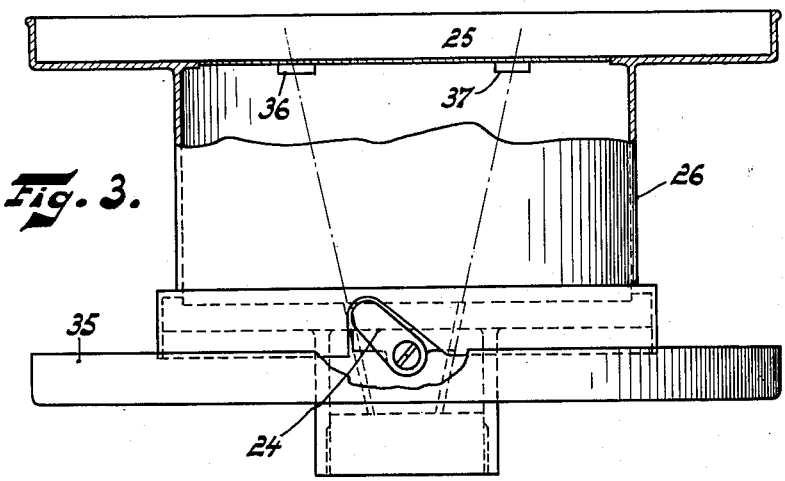
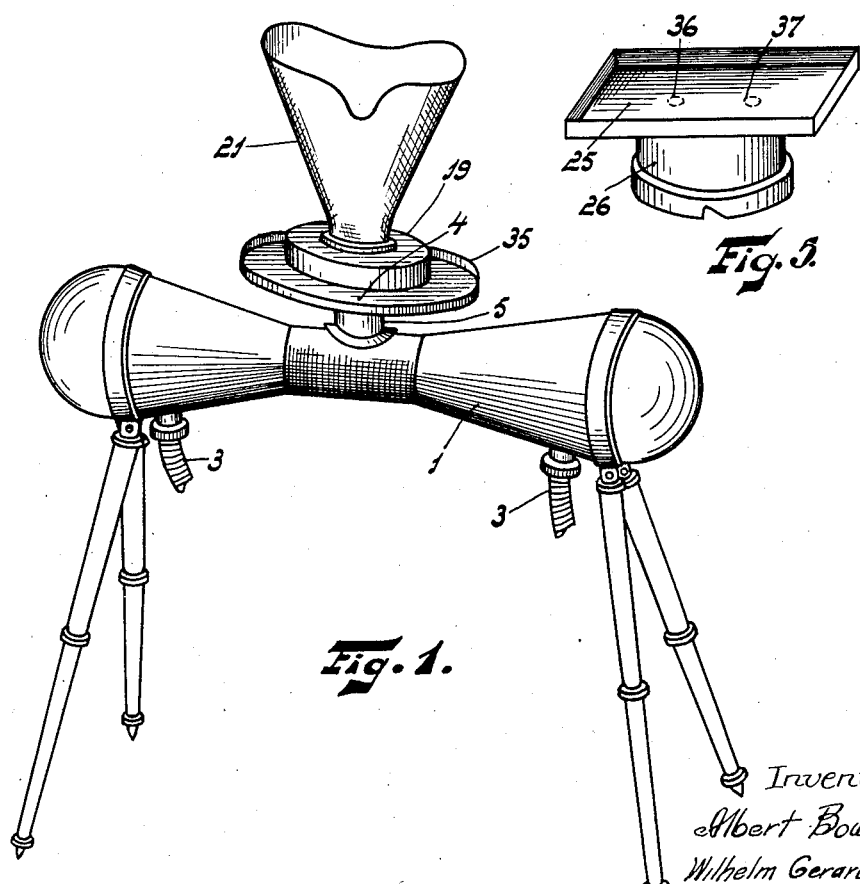
Inventors,
Albert Bouwers,
Wilhelm Gerard Burgers
and Aron Bierman.
by [signature]
Attorney.

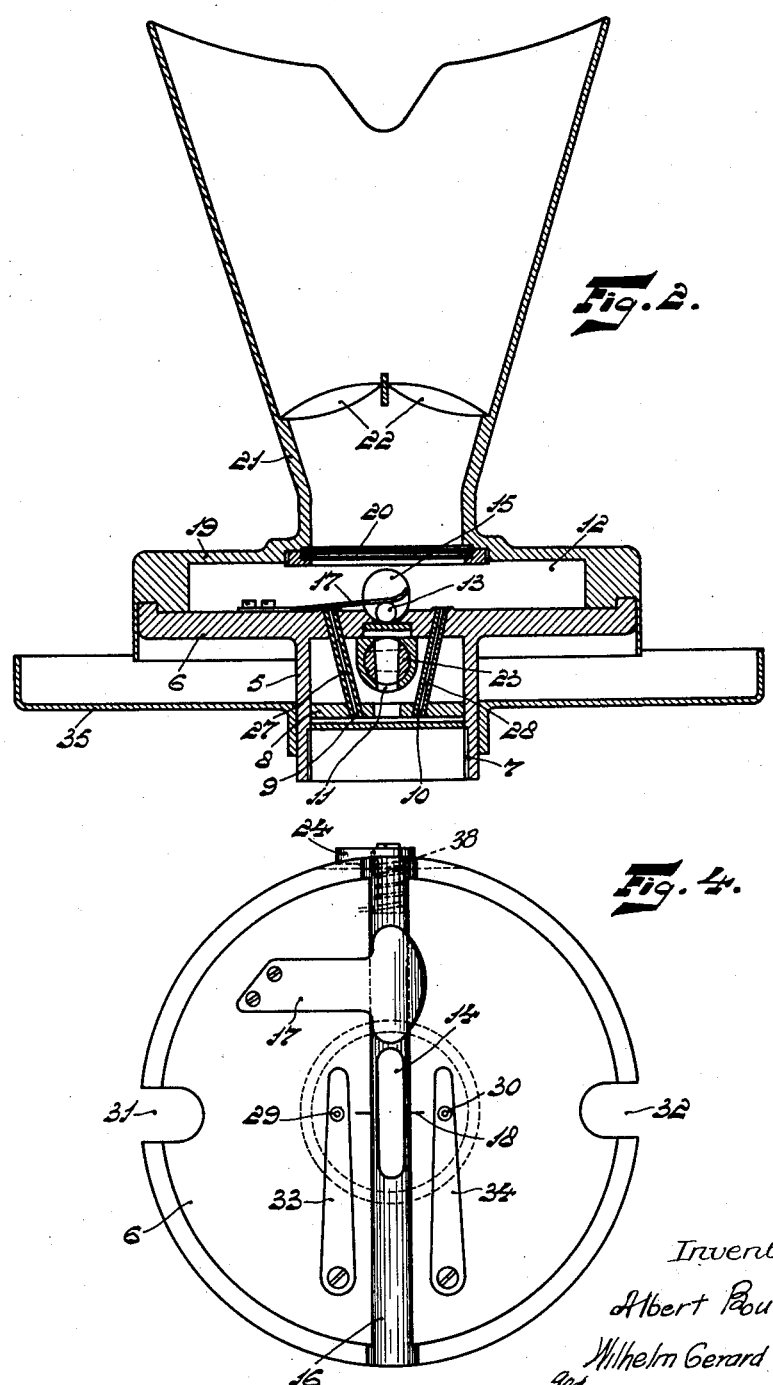

Patented Jan. 22, 1935

1,988,993

UNITED STATES PATENT OFFICE 1,988,993

APPARATUS FOR EXAMINING CRYSTALLINE BODIES BY MEANS OF X-RAYS

Albert Bouwers, Wilhelm Gerard Burgers, and Aron Bierman, Eindhoven, Netherlands, assignors to N. V. Philips' Gloeilampenfabrieken, Eindhoven, Netherlands Application April 28, 1930, Serial No. 448,038
In the Netherlands July 15, 1929

9 Claims. (Cl. 250—34)

X-rays may be used for examining crystalline bodies, for example, pearls and the like. If a narrow beam of X-rays is caused to pass through a pearl, behind which a photographic plate is arranged, the image obtained is usually a regular figure from which conclusions may be deduced as to the nature of the pearl irradiated.

Indeed, photographic diagrams produced in this way have the peculiarity that they are distinct from each other according to whether natural pearls or cultivated pearls are concerned. Therefore it will be obvious that such diagrams constitute an excellent means for determining the nature of the pearl.

It has been found, however, that in many cases this examination may be effected more quickly by a simple observation of a pearl which is irradiated by means of X-rays. By this irradiation a fluorescence is produced, the nature of which is closely connected with the kind of the pearls irradiated and by which an expert is enabled to draw a conclusion as to the nature of the pearl.

This invention has for its purpose to provide a simple apparatus by means of which such an examination may be effected. It is essentially constituted by an X-ray tube of the type in which a metal envelope, which is provided with a window for the passage of X-rays, surrounds the discharge path; this X-ray tube carrying an auxiliary member which catches the rays emerging from the window and which comprises means for observing the action of the rays on a crystalline body placed inside the member.

The apparatus is rendered suitable for optical observation by providing the said auxiliary member with a cover which is practically impervious to X-rays and made entirely or partly of glass. Without special means the observation must take place in a dark room, since the fluorescence phenomenon is usually weak. This is not necessary if the apparatus is provided with an inspection tube in which a vitreous portion of the cover constitutes a window. The eye may be closely approached to the tube so that no trouble is caused by light penetrating from the outside, since the eye constitutes what may be termed the rear wall of a dark room. The glass window serves for the passage of visible rays, but absorbs the X-rays in order to protect the eyes.

A further improvement consists in that an arrangement is provided by which the X-rays are entirely or partly prevented from emerging as long as the cover is not placed on said member. Such an arrangement may be constituted by a cut-off which is practically impervious to X-rays and by which an aperture for the passage of these rays is kept closed, but which, upon removing the cover, is moved into a position in which this aperture is unobstructed.

In addition the apparatus according to the invention may comprise a cassette-holder which may be fixed on the member. A particularly practical combination is obtained if such the cassette-holder and the cover for the optical observation are interchangeable.

By the term "cassette-holder" is meant a member which serves for the arrangement of a cassette comprising a photographic plate or film. This cassette-holder need not be light and airtight since the photographic plate is protected in the usual way from visible light rays by the wall of the cassette through which the X-rays may practically freely pass.

The invention will be more clearly understood by reference to the accompanying drawings representing, by way of example, one embodiment of the invention.

Fig. 1 is a perspective view of the complete apparatus.

Fig. 2 is a section of the auxiliary member, in which the cover for optical observation is arranged.

Fig. 3 is a view of the same member, in which the cover is replaced by a cassette-holder.

Fig. 4 is a plan view in which the cassette-holder or the cover are not represented.

Fig. 5 is a perspective view of the cassette holder.

In Fig. 1 the X-ray tube is denoted by 1. This tube comprises a metal envelope and is supported by four extensible and pivotally fixed legs. The current is supplied to the tube through the cables 3, which are only partly shown on the drawings. The tube comprises a metal wall portion which in combination with vitreous wall portions, by means of which it is insulated from both electrodes, constitutes the envelope of the tube and is connected to earth during the operation. This metal wall portion is in direct contact with the metal envelope of the tube and has a window for the passage of the X-rays emitted by the anticathode. The rays are caught by the auxiliary member 4 which is carried by the tube.

Fig. 2 shows the construction of the auxiliary member which essentially consists of a cylindrical portion 5 and a table 6. The cylindrical portion is provided with screw threads for securing the auxiliary member to the X-ray tube. The rays emerge from this cylindrical portion but are absorbed for the greater part by a diaphragm 8 which is made, for example, of lead. The entrance is permitted only by three canals 9, 10 and 11. The purpose of the canals 9 and 10 will be explained hereinafter.

In the position shown on the drawings the rays may penetrate into the irradiation chamber 12 through the canal 11, where they strike the objects to be examined, for example, one or more pearls 13. These pearls may form part of a string of pearls which may be moved through the chamber 12. This is shown in Fig. 4 in which the aperture through which the rays penetrate into the irradiation chamber is designated by 14. The side wall is provided with apertures 15 for the passage of a string of pearls, the groove 16 in the table 6 serving for guiding the string which is slightly clamped by means of an elastic plate 17 made of celluloid. A mark 18 enables the observer to keep a definite pearl in view.

The irradiation chamber is closed by a cover 19 which is impervious to X-rays. This cover is entirely or partly made of glass, for example, glass containing a high percentage of lead-oxide, which checks the X-rays, but allows the visible light to pass practically freely through it. When the apparatus is operated in a dark room, the operator may observe through the vitreous cover how the pearls react upon the irradiation by X-rays. They fluoresce but not always in the same way. Due to the colour and the intensity of the fluorescence light they show their nature to the expert, so that artificial or cultivated pearls can be immediately distinguished from natural pearls.

In the apparatus shown on the drawings only a central portion 20 of the cover is made of glass. This portion constitutes a window of a funnel-shaped inspection tube 21, whose mouth is shaped as a mask. Due to this the operator may make observations with both eyes simultaneously, and as the aperture of the inspection tube is closed by the face no light can penetrate into the tube 21 from the outside, and thus it is not necessary that the observations be effected in a dark room.

Furthermore the tube 21 comprises a pair of amplifying lenses 22 by which the effect is increased. It is evident that also the window 20 may be polished so as to form an amplifying lens. In addition this window may be provided with crossed hair-lines by means of which a definite object may be easily fixed. If desired, the lenses 22 may also be made of glass impervious to X-rays.

As the fluorescence phenomenon may evidently also be observed in the dark without the cover in place on the apparatus, it is possible that the operator may use the apparatus without the cover. In this case the operator would be exposed to the action of X-rays which is detrimental in the case of extended exposure to the rays. In the apparatus shown on the drawings this is prevented by a special arrangement. In the canal 11 a cut-off 23 is mounted. In the position shown on the drawings an aperture is left free by it for the passage of the rays. If the cover is removed, however, then the cut-off turns a quarter of a revolution and the canal 11 is closed to the X-rays. This is effected by a spring 38. The cut-off has secured to it a cam 24, which projects outside the wall of the irradiation chamber. When the cover 19 is properly arranged, its edge presses down cam 24 against the action of the spring, so that the cut-off is opened. When the cover is removed the cut-off occupies the position indicated in dotted lines in Fig. 2, in which case no X-rays emerge from the canal 11.

If a photographic examination is preferred, a cassette holder shown in Fig. 3 instead of the cover 19 may be disposed on the table 6. This cassette holder is simply constituted by a flat box 25 secured to a cylinder 26, whose rim surrounds that of the table 6. In the box 25 a film cassette may be laid. The rim of the cylinder 26 is provided with a recess, due to which the cam 24 is left free, so that the cut-off is not moved when arranging the cassette holder and the canal 11 remains closed.

The other canals 9 and 10 serve for the photographic observation. These canals are constituted by narrow tubes 27 and 28 which are mounted in such manner that their axes intersect at the focal spot on the anticathode. Consequently X-rays may pass through these tubes but only in two very narrow beams. On each of the ends 29 and 30 of the tubes which are made of a material impervious to X-rays, a pearl may be laid.

Also in this case a complete string may be examined, which may be supplied and taken out respectively through the recesses 31 and 32 in the rim of the table 6. Two pearls may be photographed simultaneously, and for this purpose they are clamped in the correct position by means of clamps 33 and 34 made of celluloid. It is also possible to use separate holders which may be provided, if desired, with a centering device and with an arrangement which permits of turning the pearls through a given angle. In order to guard against that loose pearls getting lost during the examination, a plate 35 is secured to the cylindrical portion 5, this plate receiving the pearls which might roll way.

The beam of X-rays passing through the pearls without being reflected, does not strike the photographic plate but is absorbed by the lead discs 36 and 37. These rays are materially stronger than the reflected rays and would be prejudicial to the definition. However, in order to know to which of the irradiated pearls each of the two simultaneously taken images refers, a small central aperture is provided in the disc 36, so that the centre of the image formed behind this disc shows a black point, by which it can be distinguished from the other image. In this way two interference diagrams are simultaneously obtained and which are produced under equal conditions, so that by comparison very reliable conclusions can be drawn.

What we claim is:

1. Apparatus for examining pearls and precious stones with the aid of X-rays, comprising an X-ray tube having mounted thereon a box-shaped member intercepting the beam of X-rays from the tube and positioning the objects to be examined in said beam, said box-shaped member having an aperture through which the beam of X-rays passes and a cover portion which is impervious to X-rays but through which the action of the X-rays on said objects may be observed, and means for closing said aperture when said cover portion is removed, said means being engaged by the cover portion when the latter is replaced to open said aperture.

2. Apparatus for examining pearls and precious stones with the aid of X-rays, comprising an X-ray tube provided with a window through which the beam of X-rays passes, a radiation chamber of material substantially impervious to X-rays mounted on said tube and provided with an aperture in the path of said beam, said chamber including a removable cover substantially impervious to X-rays, and means for closing said aperture to the passage of X-rays except when said cover is mounted in place.

3. Apparatus for examining pearls and precious stones with the aid of X-rays, comprising an X-ray tube provided with a window through which the beam of X-rays passes, a shielding member of material substantially impervious to X-rays mounted on said tube and provided with relatively large and relatively small apertures in the path of said beam, means for closing the relatively large aperture to the passage of X-rays and means for supporting a photographic plate in operative relation to the relatively small aperture.

4. Apparatus for photographing the reflected rays from X-radiated pearls and like crystalline bodies, comprising an X-ray tube, means carried by said tube for supporting said bodies in the path of the beam of X-rays therefrom and means for absorbing the unreflected rays passing through said bodies.

5. Apparatus for photographically comparing two crystalline bodies comprising an X-ray tube, means carried by said tube for supporting said bodies in the path of the beam of X-rays therefrom, means for simultaneously photographing the interference patterns produced and means whereby the record produced by each of said bodies may be positively identified on the photograph.

6. Apparatus for examining objects with the aid of X-rays, comprising an X-ray tube of the type having a protective metal sleeve, a holder for said objects mounted on said sleeve, and a transparent cover therefor through which said objects may be viewed, said holder and cover being substantially impervious to X-rays and arranged to shield the user of the apparatus against stray or secondary radiation.

7. Apparatus for examining pearls and precious stones with the aid of X-rays comprising an X-ray tube having mounted thereon a box-shaped member intercepting the beam of X-rays from the tube and positioning the objects to be examined in said beam, said member being provided with an aperture for the passage of X-rays, and a cover for said member which is impervious to X-rays and which is made at least partly of glass.

8. In combination, a supporting stand including legs, an X-ray tube on said stand, insulated supply conductors connected to said tube, a metallic sleeve surrounding said tube, insulated from said conductors and secured to said stand, means on said sleeve for supporting objects to be examined in the path of the beam of X-rays from said tube and a cover therefor which is impervious to X-rays but through which the action of the X-rays on objects placed on said supporting means may be observed, said supporting means being adapted to receive a holder for a photographic film cassette.

9. Apparatus for examining pearls and precious stones with the aid of X-rays comprising an X-ray tube provided with a window through which the beam of X-rays passes, a radiation chamber secured to said tube in front of the window, said chamber having a bottom and a removable cover, said bottom being formed with a groove for guiding a string of objects to be examined and said chamber having apertures for the introduction of such a string into the chamber, and an opening for the passage of X-rays intersecting said groove, spring-actuated means for normally preventing the passage of X-rays through the opening in the bottom of said chamber, said removable cover having a transparent portion through which the objects in said chamber may be examined and another portion engaging said spring-actuated means to move the same to a position in which X-rays are admitted to the chamber when the cover is in place.

ALBERT BOUWERS.
WILHELM GERARD BURGERS.
ARON BIERMAN.